3,434,987
AQUEOUS STOVING VARNISH BASED ON AMINE SALTS OF SEMIESTERS OF HYDROXYL GROUP-CONTAINING, FATTY ACID-MODIFIED ALKYD RESINS

Rolf Dhein and Karl Raichle, Krefeld-Bockum, and Hermann Schnell, Krefeld-Uerdingen, Germany, assignors to Farbenfabriken Bayer Aktiengesellschaft, Leverkusen, Germany, a corporation of Germany
No Drawing. Continuation-in-part of application Ser. No. 691,978, Dec. 20, 1967, which is a continuation-in-part of application Ser. No. 553,036, May 26, 1966. This application Dec. 21, 1967, Ser. No. 692,287
Claims priority, application Germany, Dec. 22, 1966, F 51,040
Int. Cl. C09d 3/66, 3/52
U.S. Cl. 260—21    6 Claims

ABSTRACT OF THE DISCLOSURE

High gloss aqueous stoving varnishes based on amine salts of semiesters of tetrahydrophthalic acid or its homologs and hydroxyl group-containing fatty acid-modified alkyd resins.

CROSS REFERENCE TO RELATED APPLICATIONS

This application is a continuation-in-part of application Ser. No. 691,978 filed Dec. 20, 1967, and now abandoned, which, in turn, is a continuation-in-part of application Ser. No. 553,036 as filed May 26, 1966, and now abandoned.

It is known that the acid number of hydroxyl group-containing, fatty acid-modified alkyd resins the amine salts of which cannot be used for the preparation of water-dilutable varnish raw materials because the acid number of the alkyd resins is too low, and which are therefore briefly called "water-insoluble" alkyd resins, can be increased by the reaction with phthalic acid anhydride or maleic acid anhydride, with formation of the semiester, to such an extent that water-dilutable amine salts can be obtained. In this way there are obtained, possibily only after the addition of water-miscible organic solvents, varnish raw materials which can be hardened in the hot by themselves or in combination with phenol resins or aminoplasts.

Such aqueous binder systems which contain pigments and/or fillers are primarily used as stoving primers and fillers, whereas the covering varnish coats usually still consist of conventional nonaqueous systems, since the production of varnish coats of satisfactory gloss encounter difficulties, especially with a higher pigmentation.

Suprisingly, it has now been found that water-dilutable varnish raw materials yielding varnish coats of particularly high gloss are obtained by using amine-neutralized resins based on "water-insoluble" hydroxyl group-containing, fatty acid-modified alkyd resins the acid number of which is not more than 8 and in which the molar ratio of the condensed polyols to the condensed dicarboxylic acids amounts to between about 1:1 and about 1.3:1, and which are changed to semiesters of tetrahydrophthalic acid or its homologues, whose total acid number as defined below is between about 40 and about 60, and in which the difference between the total acid number and the semiester acid number as defined below is <6, and in which the degree of neutralization of the semiester is lower than 95%, preferably about 80% or lower.

The above ratio polyol/dicarboxylic acid in the alkyd resin is not unusual, but it is critical for high gloss varnish coats. With a higher excess of polyols or higher acid numbers of the initially water-insoluble alkyd resins, the resins obtained after the reaction with tetrahydrophthalic acid anhydride yield dull varnish coats.

On the other hand, the effect of the tetrahydrophthalic acid or its homologues is specific, as not only the known reaction products with phthalic acid anhydride and maleic acid anhydride, but also the semiesters of, for example, hexahydrophthalic acid, trimellitic acid and succinic acid yield dull to moderately glossy varnish coats.

Besides tetrahydrophthalic acid itself, the following homologues are suitable for the formation of the semiesters, for example: 4-methyl-tetrahydrophthalic acid, 3-methyl-Δ-4-tetrahydrophthalic acid, 4-methyl-Δ-4-tetrahydrophthalic acid, 3,6-dimethyl-Δ-4-tetrahydrophthalic acid, 3-ethyl-Δ-4-tetrahydrophthalic acid and endomethylene-tetrahydrophthalic acid or their anhydrides.

Water-dilutable alkyd resins which are obtained in a single step process by simultaneous esterification of the same alkyd resin components up to acid numbers as are required to achieve dilutability in water, e.g., 40–80, have a relatively low molecular weight and this has an adverse effect on the water resistance and other properties of the varnish coats prepared therefrom.

On the other hand, the varnishes according to the invention are derived from substantially fully condensed, i.e., high molecular alkyd resins with low acid numbers. Consequently, they are eminently suitable for the production of pigmented stable varnish coats of high gloss, very good water resistance, adhesiveness and elasticity.

The alkyd resins containing fatty acids are prepared in known manner from polyols and dicarboxylic acids or their anhydrides with the addition of non-drying, semidrying or drying oils, such as coconut oil, castor oil, dehydrated castor oil, soya oil or linseed oil, or of mixtures of such oils or their transesterification products with polyols. Instead of the oils or their transesterification products, there may also be used fatty acids obtained from natural oils or from synthetic fatty acids or from natural fatty acids by hydrogenation, dehydration or dimerization, such as soya fatty acid, linseed fatty acid, coconut fatty acid, ricinoleic acid, hydrogenated ricinoleic acid, dehydrated ricinoleic acid, synthetic and natural first running fatty acids, and the fatty acids obtainable from paraffin hydrocarbons.

Other monocarboxylic acids, such as benzoic acid, tert.-butyl-benzoic acid and resinic acids may be added.

The polyols must be at least trihydric alcohols, e.g., glycerol and trimethylol-propane. Tetrahydric and higher alcohols, such as pentaerythritol, dipentaerythritol and sorbitol, or mixtures thereof with the aforesaid polyols, are particularly suitable for the production of water-dilutable resins, since high hydroxyl numbers of the alkyd resins favour the water-dilutability. Dihydric alcohols, such as ethylene glycol, diethylene glycol, butanediols or neopentyl glycol, may be added.

Suitable dicarboxylic acids are, for example, adipic acid, isophthalic acid, and the phthalic acid anhydride which is most commonly used.

The production of the alkyd resins is carried out in known manner by polyesterification at elevated temperatures. When ricinoleic acid is added, it may be advantageous to carry out the polyesterification at low temperatures, if the hydroxyl group of the ricinoleic acid is to be retained, which has an advantageous effect on the water-dilutability. Very high esterification temperatures are recommended when the ricinoleic acid is to be dehydrated simultaneously with the polyesterification.

Apart from the limits to be observed according to the invention, i.e., a molar ratio polyol/discarboxylic acid between 1:1 and 1.3:1 and acid numbers below 8, it is known that a sufficiently high hydroxyl number of the alkyd resin is important for the reaction with tetrahydrophthalic acid anhydride described below. To support the water-dilutability, free hydroxyl groups must still be available after the reaction with tetrahydrophthalic acid anhydride giving the semiester. A hydroxyl number of 60–100 will frequently be sufficient, but higher hydroxyl numbers, e.g., 100–200, are also possible.

The reaction of the alkyd resins with tetrahydrophthalic acid anhydride is preferably carried out under reaction conditions permitting the completest possible semiester formation.

To control the semiester formation, two acid number determinations are carried out by two different methods. The total acid number in the presence of pyridine comprises all free acid groups and both carboxyl groups of every anhydride, in that titration is carried out in the absence of alcohols. The semiester acid number comprises all free acid groups and only one carboxyl group of every anhydride, in that titration is carried out in the presence of alcohols. The difference between the two titrations yields, after conversion, the residual content of free anhydride. Since free anhydride reduces the gloss, the reaction of the alkyd resin with the acid anhydrides should be continued until the difference between the two acid number determinations is less than 6.

Suitable reaction conditions are reaction temperatures between about 100 and 160° C. A miximum semiester formation takes place, for example, at 140° C. within 30 minutes. With higher reaction temperatures and longer reaction times, carboxyl groups may be lost through esterification. The quantitative proportions are expediently so chosen that an alkyd resin with a total acid number between about 40 and 60 is obtained when the semiester formation is completed. Lower acid numbers impair the water-dilutability, higher acid numbers impair the resistance to atmospheric corrosion.

The alkyd resins are preferably so composed that they contain exactly the number of hydrophilic groups, i.e., the sum total of hydroxyl and carboxyl groups, required for the preparation of readily dilutable aqueous varnishes if the aforesaid organic solvents are added; particularly stable varnish coats are thus produced.

When the reaction is completed, the alkyd resins are expediently mixed with organic solvents which are completely or partially water-miscible. Organic solvents of this type are, in particular, ether alcohols, such as ethylene glycol mono-methyl, -ethyl, -butyl ether, but also alcohols, esters, ketones, keto-alcohols or ethers. They have an advantageous effect on the dilutability in water and reduce the viscosity.

The conversion of the alkyd resins into their water-dilutable salts is carried out in known manner by the addition of amines. The amount of amine must be such that the degree of neutralisation is lower than 95%, preferably about 80% or lower. This is the case when a dilution with water and optionally with organic solvents, which contains 30% alkyd resin, has a Ph value of not more than 8, particularly between 6.8 and 7.5, measured with indicator paper. While lower pH values should be avoided for reasons of the finish stability, higher pH values lead to noticeable reductions of the gloss.

Suitable amines are, for example, secondary and tertiary alkylamines, such as methylamine, diethylamine, triethylamine; and amino-alcohols, such as ethanolamide, diethanolamine, triethanolamine, N-methyl-ethanolamine, N.N-dimethyl-ethanolamine, 3-amino-propanol, and their ethers, such as 3-methoxy-propylamine; but also morpholine. Since ammonia and the readily volatile mono- and dialkylamines may impair the stability of the aqueous solutions in the presence of aminoplasts, and the barely volatile amines, such as triethanolamine, may lead to yellowing of the varnish coats, triethylamine, diethanolamine and dimethyl-ethanolamine have proved to be especially suitable representatives of these series.

The alkyd resin salt solutions can be prepared at any desired concentration and they can be further diluted with water as required.

The usual procedure for the preparation of the aqueous varnishes consists in grinding solutions of alkyd resin salts of the highest possible concentration and containing little water, with pigments in roller mills or ball mills. Pastes are thus obtained, from which the desired varnishes can be prepared by the addition of water and a further amount of the alkyd resin salt solution, optionally with the addition of likewise water-dilutable aminoplasts, siccatives and defoaming agents.

The varnishes can be applied to the articles to be coated by usual methods, such as spraying, dipping, pouring, spreading or also electrophoretically. To achieve the full gloss effect, it is advantageous to store the varnishes, prior to application, for about 48 to 72 hours.

The hardening of the coats is carried out at temperatures above about 100° C., and the stoving time depends on the chosen stoving temperature. The varnish raw materials according to the invention yield varnish coats which adhere well to metal, are water resistant and are characterised by an excellent gloss.

The parts given in the following examples are parts by weight, unless otherwise stated.

EXAMPLE 1

136.0 parts pentaerythritol, 126.2 parts of a natural first runnings fatty acid and 134.5 parts phthalic acid anhydride are esterified with stirring in a nitrogen atmosphere at 220° C. until the acid number is 6 and the viscosity amounts to about 260 seconds (measured according to German Industrial Standard 53211 on a 40% solution in xylene).

This alkyd resin which is completely insoluble in water after the addition of amines and contains polyol and dicarboxylic acid in a molar ratio of 1.1:1, is then reacted with 35.9 parts tetrahydrophthalic acid anhydride at 140° C. for 30 minutes to form the semiester. The resultant resin with a total acid number 40 and a difference between the total acid number and the semiester acid number of 2, is dissolved in ethylene glycol monobutyl ether to give a 63.5% solution, then mixed at room temperature with sufficient dimethyl-ethanolamine and diluted with distilled water to an alkyd resin content of 55%, so that a further dilution of this solution with water to an alkyd resin content of 30% has a pH value of 6.8–7.0 (measured with Merck's special indicator paper, pH range 6.4–8.0); this corresponds to a degree of neutralization of 90%. The viscosity of this 30% solution amounts to about 130 seconds.

A varnish prepared from 45.5 parts of the 55% solution, 15.0 parts titanium dioxide (rutile), 8.4 parts of a conventional 60% aqueous solution of a melamine resin as is obtained as hardening component for water-dilutable stove varnishes by condensation of melamine with formaldehyde and etherification of the methylol groups by means of methanol, with a viscosity of 25 seconds, and 31.2 parts of water, is applied, after a maturing time of 72 hours, to metal sheets by means of a spray gun. After an airing time of 10 minutes, the varnish-coated sheets are stoved at 150° C. for 30 minutes. Pure white, well hardened varnish coats with a degree of gloss of 73[1] are obtained.

As distinguished from the products according to the invention, the following Examples 2 and 3 describe varnish raw materials which yield only dull to moderately glossy varnish coats some of which are even readily attacked by water.

EXAMPLE 2

When pentaerythritol, a natural first runnings fatty acid, phthalic acid anhydride and tetrahydrophthalic acid anhydride are esterified in the quantitative proportions of Example 1, but together in one step until the acid number is ---
[1] The gloss evaluation is carried out according to ASTM D523–53T at a reflection angle of 20° in a Gardner gloss meter. The higher the stated value, the better is the gloss.

40, and this product is dissolved as described in Example 1, then a varnish prepared according to Example 1 from the 55% solution exhibits, under the same stoving conditions, a varnish coat with a degree of gloss of only 14 and a very poor water resistance. Little bubbles appear in varnish coat already after watering for 10 days, whereas the varnish coat according to Example 1 is completely free from bubbles even after 20 days' watering.

EXAMPLE 3

When the water-insoluble alkyd resin described in Example 1 is reacted, instead of with tetrahydrophthalic acid anhydride, with the acid anhydrides indicated in the following table in such quantitative proportions that comparable alkyd resin semiesters with approximately the same final acid numbers are formed, and when 55% neutralised solutions are prepared from these resins according to Example 1, then varnishes of the composition of Example 1 can be prepared therefrom, but, in contradistinction to Example 1, these yield only dull to weakly glossy varnish coats. In some cases the degrees of gloss which can be achieved are even further reduced, when the varnishes are diluted to a binder content of 25%, as is often the case in order to obtain varnishes of low viscosity with good running properties.

cosity of 68 seconds (measured on a 40% solution in xylene) is transformed into a 55% solution as described in Example 1. The pH value, measured by the method described in Example 1, amounts to 7.0.

A varnish composed according to Example 1 is applied, after a maturing time of 72 hours, to metal sheets by means of a spray gun. The coated sheets are stoved, after the usual airing time, at 150° C. for 30 minutes. Well hardened varnish coats are obtained, which also have a good elasticity, good running properties and a degree of gloss of 68.

EXAMPLE 6

1768.0 parts pentaerythritol, 1640.6 parts of a natural first runnings fatty acid and 1748.5 parts phthalic acid anhydride are esterified with stirring in a nitrogen atmosphere at 220° C. until the acid number is 5 and the viscosity amounts to 180 seconds (measured in a 40% solution in xylene according to German Industrial Standard 53211).

951.9 parts of this water-insoluble alkyd resin which contains polyol and dicarboxylic acid in a molar ratio of 1.1:1, are reacted with 101.9 parts 4-methyl-tetrahydrophthalic acid anhydride at 140° C. until a resin with the total acid number 40 is formed, and this is dissolved in

|  | Ex. 1 | Ex. 3a | Ex. 3b | Ex. 3c | Ex. 3d | Ex. 3e |
| --- | --- | --- | --- | --- | --- | --- |
|  | Anhydride used for preparation | | | | | |
|  | Tetrahydrophthalic acid anhydride | Phthalic acid anhydride | Succin. acid anhydride | Maleic acid anhydride | Trimellit. acid anhydride | Hexahydrophthal. acid anhydride |
| Acid number of alkyd resin semiester | 40 | 40 | 42 | 38 | 39 | 40 |
| Degree of gloss of coats stoved at 150° C. acc. to Ex. 1 | 73 | 50 | 28 | 39 | 10 | 14 |
| Degree of gloss of coats from lacquers further diluted with water | 70 | 28 | 24 | 20 | 20 | 30 |

The following example clearly shows that only the semiesters prepared according to the invention from water-insoluble alkyd resins with acid numbers below 8, which contain polyols and dicarboxylic acids in a molar ratio of about 1:1 to 1.3:1, yield varnish raw materials for glossy films with tetrahydrophthalic acid anhydride, whereas semiesters from tetrahydrophthalic acid anhydride and alkyd resins which also have acid numbers below 8 but a molar ratio polyol to dicarboxylic acid of e.g. 1.35:1, yield only varnish raw materials for dull coats.

EXAMPLE 4

An alkyd resin with the acid number 6 is prepared from 136.0 parts pentaerythritol, 126.2 parts of a natural first runnings fatty acid and 109.5 parts phthalic acid anhydride. Due to its higher excess of polyols, this alkyd resin has a substantially lower molecular weight and lower viscosity. It is reacted with 33.7 parts tetrahydrophthalic acid anhydride as described in Example 1 so that a comparable resin with a total acid number of 40 is formed. When a varnish is prepared from the resultant alkyd resin according to Example 1 and this is applied to metal sheets by means of a spray gun, then dull varnish coats with a degree of gloss below 10 are obtained after an airing time of 10 minutes and a hardening time of 30 minutes at 150° C.

EXAMPLE 5

136.0 parts pentaerythritol, 84.0 parts coconut fatty acid, 149.0 parts ricinoleic acid and 125.8 parts phthalic acid anhydride are esterified with stirring in a nitrogen atmosphere, initially at 180° C. and then at 200° C., until the acid number is 5.

This alkyd resin which is completely water-insoluble after the addition of amine and contains polyol and dicarboxylic acid in a molar ratio of 1.18:1 is then reacted with 60.8 parts tetrahydrophthalic acid anhydride at 140° C. for 30 minutes to form the semiester. The resultant resin with the total acid number 50 and a visethylene glycol monobutyl ether to form a 63.5% solution. After cooling to room temperature, the solution is mixed with sufficient dimethyl-ethanolamine and diluted with water to an alkyd resin content of 55% so that the degree of neutralization amounts to 80% and that a solution further diluted with water to a concentration of 30% has a pH value of 7.0–7.2 (measured with Merck's special indicator paper, pH range 6.4–8.0).

A varnish produced from 45.4 parts of the 55% solution, 15.0 parts titanium dioxide (rutile), 8.4 parts of a conventional 60% aqueous solution of a melamine resin as is obtained as hardening component for water-dilutable stoving varnishes by condensation of melamine with formaldehyde and etherification of the methylol groups by means of methanol, and 31.2 parts of water, is diluted, after a maturing time of 72 hours, with water to an alkyd resin content of 20% and applied to metal sheets by means of a spray gun. The coated sheets are stoved, after an airing time of 10 minutes, at 150° C. Well hardened white varnish coats are obtained with a degree of gloss of 76 (measured in a Gardner gloss meter according to ASTM D523–53T at a reflection angle of 20°).

The following examples show that deviations from the stated characteristics will reduce the gloss-yielding effect of the acid component forming the semiesters. The examples demonstrate once more that only the combination of a number of known measured enables the surprising improvements in lacquer technique to be achieved.

EXAMPLE 7

An alkyd resin according to Example 6, but esterified at 220° C. to acid number 11, is reacted as described in Example 6 to form the semiester. There is obtained an alkyd resin semiester with a total acid number of 48 and a semiester acid number of 44. This is dissolved as described in Example 6 and worked up to a varnish. A varnish coat hardened at 150° C. for 30 minutes has a degree of gloss of only 46.

EXAMPLE 8

A varnish according to Example 6, but prepared from a 55% solution with a degree of neutralization of 95%, yields, as distinguished from Example 6, a varnish coat with a degree of gloss of only 10.

EXAMPLE 9

136.0 parts pentaerythritol, 126.2 parts of a natural first runnings fatty acid with the acid number 340–350, and 134.5 parts phthalic acid anhydride are condensed with stirring in a nitrogen atmosphere at 220° C. until an alkyd resin with the acid number 6 and a viscosity of 233 seconds (measured according to German Industrial Standard 53211 on a 40% solution in a xylene) is obtained. 366.1 parts of this water-insoluble alkyd resin containing polyol and dicarboxylic acid in a molar ratio of 1.1:1 are reacted with 39.1 parts endomethylene-tetrahydrophthalic acid anhydride at 160° C. until a resin with the total acid number 40 and a difference between the total acid number and the semiester acid number of 2 is formed, and this is dissolved in ethylene glycol monobutyl ether to form a 63.5% solution. After cooling to room temperature, the solution is mixed with sufficient dimethyl-ethanolamine and diluted with water to an alkyd resin content of 55% so that a further dilution of this solution to 30% has a pH value of 6.8%–7.0 (measured with Merck's special indicator paper, pH range 6.4–8.0).

A varnish produced from 45.4 parts of the 55% solution, 15.0 parts titanium dioxide (rutile), 8.4 parts of a conventional 60% aqueous solution of a melamine resin as is obtained as hardening components for water-dilutable stoving varnishes by condensation of melamine with formaldehyde and etherification of the methylol groups by means of methanol, with a viscosity of 25 seconds and 31.2 parts of water, is applied, after a maturing time of 72 hours, to metal sheets by means of a spray gun. The coated sheets are stoved, after an airing time of 10 minutes, at 150° C. for 30 minutes. Well hardened white varnish coats with a degree of gloss of 68 are obtained.

What we claim is:

1. Aqueous stoving varnishes based on amine salts of semiesters of hydroxy group-containing, fatty acid-modified alkyd resins, comprising salts of semiesters of water-insoluble alkyd resins and water-insoluble alkyd resins having an acid number of not more than 8 and in which the molar ratio of the condensed polyols to the condensed dicarboxylic acids amounts to between about 1:1 and about 1.3:1, and which are changed to semiesters of tetrahydrophthalic acid or its homologues, the total acid number of which is between about 40 and about 60 and in which the difference between the total acid number and the semiester acid number is small than 6, and the degree of neutralization of the semiesters is less than 90%.

2. Varnishes according to claim 1, wherein the degree of neutralization of the semiesters is about 80 or lower.

3. Varnishes according to claim 1 containing water-miscible organic solvents.

4. Varnishes according to claim 1 containing water-miscible aminoplasts.

5. Varnishes according to claim 1 containing pigments.

6. Varnishes according to claim 1 wherein the semiesters are formed from tetrahydrophthalic acid, 4-methyl tetrahydrophthalic acid, 3 - methyl-Δ-4-tetrahydrophthalic acid, 4-methyl-Δ-4-tetrahydrophthalic acid, 3,6-dimethyl-Δ-4-tetrahydrophthalic acid, 3 - ethyl - Δ - 4-tetrahydrophthalic acid, endomethylene - tetrahydrophthalic acid or their anhydrides.

References Cited

UNITED STATES PATENTS

| | | | |
|---|---|---|---|
| 2,915,486 | 12/1959 | Shelley | 260—21 |
| 3,098,834 | 7/1963 | Jerabek | 260—22 |
| 3,196,117 | 7/1965 | Boller | 260—22 |
| 3,196,119 | 7/1965 | Boller et al. | 260—22 |
| 3,230,162 | 1/1966 | Gilchrist | 204—181 |

FOREIGN PATENTS

| | | |
|---|---|---|
| 896,743 | 5/1962 | Great Britain. |
| 962,974 | 8/1964 | Great Britain. |
| 968,223 | 9/1964 | Great Britain. |
| 691,433 | 7/1964 | Canada. |

JAMES A. SEIDLECK, *Primary Examiner.*

R. W. GRIFFIN, *Assistant Examiner.*

U.S. Cl. X.R.

117—132; 204—181; 260—22, 29.2, 29.4, 32.6, 32.8, 33.2, 33.4, 39, 40